Feb. 4, 1969  E. G. DOYLE  3,425,657

VEHICLE REAR VIEW MIRROR ASSEMBLY

Filed Feb. 27, 1967

INVENTOR.
Edward G. Doyle
BY
David A. Greenlee
ATTORNEY

United States Patent Office 3,425,657
Patented Feb. 4, 1969

3,425,657
VEHICLE REAR VIEW MIRROR ASSEMBLY
Edward G. Doyle, Grosse Pointe Woods, Mich., assignor to General Motors Corporation, Detroit, Mich., a corporation of Delaware
Filed Feb. 27, 1967, Ser. No. 618,759
U.S. Cl. 248—481   7 Claims
Int. Cl. B60r 1/04, 21/22; F16c 11/06

ABSTRACT OF THE DISCLOSURE

A rear view mirror is adjustably mounted on a support arm that has an end ball portion received within a molded plastic socket formed in a body mounting bracket. The bracket includes a frangible key received in a recess formed in the ball and a plurality of ribs received in a plurality of grooves formed in the ball to prevent movement of the ball within the socket. A predetermined force applied to the support arm twists the ball to fracture the key and deform the ribs to permit the arm to move universally, while the socket retains the ball to prevent separation of the arm from the bracket.

---

One feature of this invention is that it provides a rear view mirror assembly having connecting means interconnecting a mirror support member and a body mounting member and interlock means normally preventing movement between the members, the interlock means being frangible upon the application of a predetermined force to the support member to permit the support member to move universally relative to the mounting member, while maintaining engagement between the members.

Another feature is that the connecting means include a socket portion formed in one of the members and a ball portion formed on the other member and received therein.

Yet another feature is that the frangible interlock means includes an opening in the ball portion and a projection extending from the socket portion and received therein, the projection being frangible upon application of the predetermined force to the support member.

A further feature is that the frangible interlock includes a plurality of surface grooves formed in the ball portion and a plurality of ribs formed on the socket portion and engaging the grooves to normally prevent movement of the ball portion relative to the projection within the socket portion, the ribs being deformable upon fracture of the projection to permit movement of the ball portion within the socket portion.

These and other features of this invention will become readily apparent upon reference to the following detailed description of the attached drawings in which.

Figure 1:
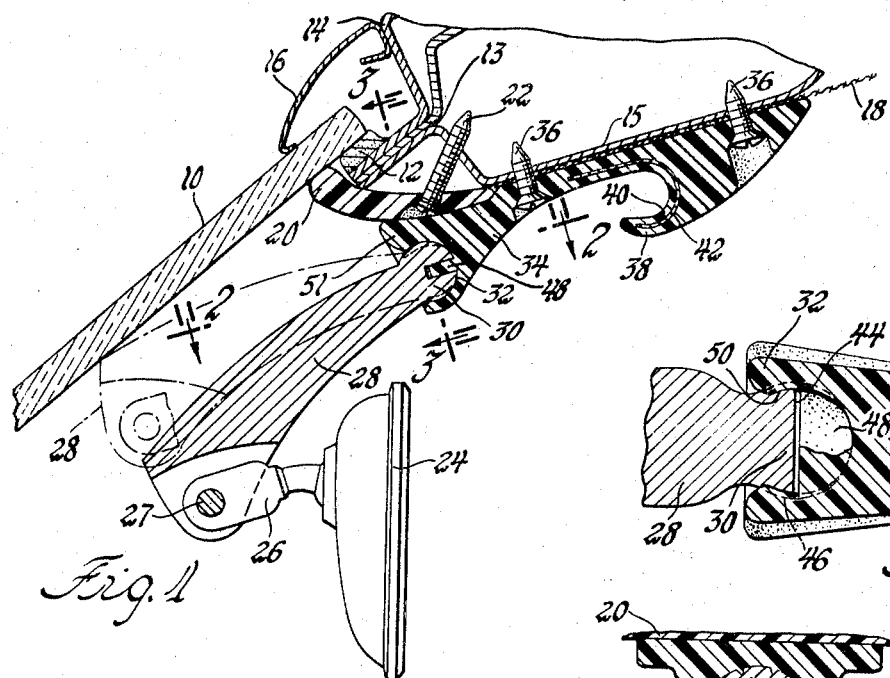
FIGURE 1 is a fragmentary sectional view of a vehicle body having a rear view mirror assembly according to one embodiment of this invention mounted on the body header.

Referring now to FIGURE 1 of the drawings, a windshield 10 is cemented at 12 to a pinchweld 13 interconnecting a roof outer panel 14 and a windshield header 15. A decorative reveal molding 16 extends between windshield 10 and panel 14 exteriorly of the passenger compartment. Interiorly of the passenger compartment, a headlining 18 extends over the header 15 and terminates under a garnish molding 20 which is retained to header 15 by screws 22.

A rear view mirror 24 is universally attached to an adjustment arm 26 which is pivoted at 27 to a bifurcated support member or arm 28 to provide for mirror adjustment. The mirror and its attachment means form no part of this invention, and reference may be had to 2,913,958, Mead et al., and 2,828,985, Ridenour, for the details thereof. Support arm 28 terminates in a spherical ball portion 30 received within a socket portion 32 of a molded plastic mounting member or bracket 34 to universally interconnect arm 28 and bracket 34. Ball portion 30 is normally held against movement relative to socket portion 32 by interlock means which will be later described.

The mounting member 34 is conventionally attached to header 15 through headlining 18 by screws 36. Member 34 preferably includes a curved lip portion 38 which forms a recess 40 for retaining the inward ends of the vehicle sunshades, not shown. A curved spring metal strip 42 provides resiliency for the lip portion 38.

Figure 2:
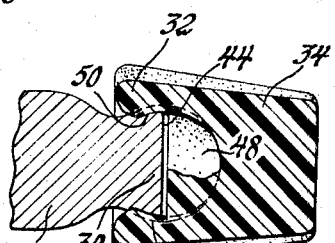
FIGURE 2 is an enlarged sectional view taken generally on the plane indicated by line 2—2 of FIGURE 1.
Figure 3:
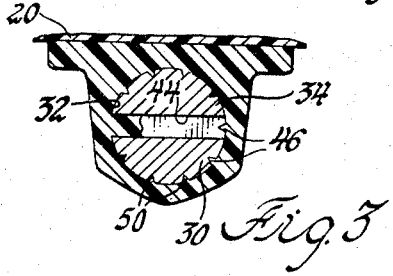
FIGURE 3 is an enlarged sectional view taken generally on the plane indicated by line 3—3 of FIGURE 1.

The interlock means will now be described with reference to FIGURES 2 and 3. Ball portion 30 includes a transverse slot or opening 44 which extends approximately half way through the ball portion. A plurality of shallow meridian surface grooves 46 are provided in the surface of the ball portion 30. These grooves each extend for approximately one-fourth the circumference of the ball and radiate about an axis prependicular to the base of slot 44.

A transverse projection or key 48 extends from the socket portion 32 and is received within the slot 44. The coaction of the slot 44 and key 48 prevents movement of arm 28 relative to bracket 34 in directions transverse of the key, but of course does not prevent movement in directions generally parallel or coplanar of the key. In order to prevent the latter movement, the socket portion 32 further includes a plurality of ribs 50 which are complementary to the grooves 46 and are received therein. The grooves 46 and ribs 50 may be of other shapes.

It can thus be seen that the ball portion 30 and the socket portion 32 are normally held against movement relative to each other by the frangible interlock means 44, 46, 48, 50 so that the mirror 24 can be adjusted relative to the arm 26 or the latter adjusted relative to the arm 28. It is intended that the bracket 34 and particularly the socket portion 32 thereof be molded about the ball portion 30 of the arm 28 to ensure a tight interfitting and coaction between the slot 44 and key 48 and the grooves 46 and ribs 50.

However, when a predetermined force, e.g. a 90-pound force, is applied to arm 28 transversely of key 48, ball portion 30 will shear the key from the socket portion and deform ribs 50 as the ball portion rotates within the socket portion. This permits arms 26 and 28 and mirror 24 to swing forwardly to the broken line position shown in FIGURE 1. The tight ball and socket connection 30, 32, while permitting universal swinging of arm 28 relative to bracket 34, prevents separation of the arm from the bracket.

Figure 4:
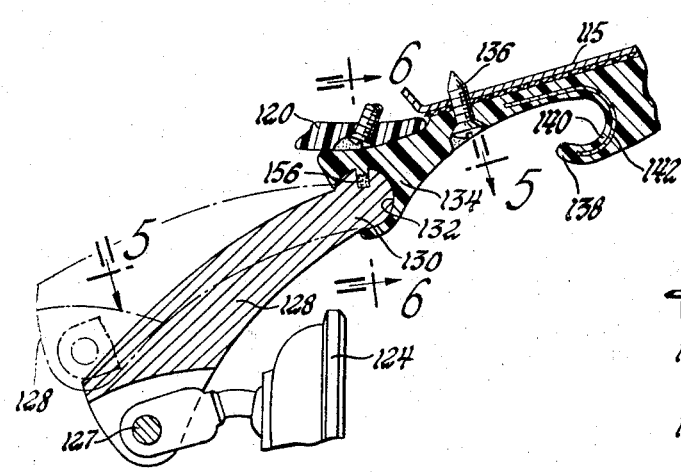
FIGURE 4 is a view similar to FIGURE 1 showing another embodiment of this invention.
Figure 6:
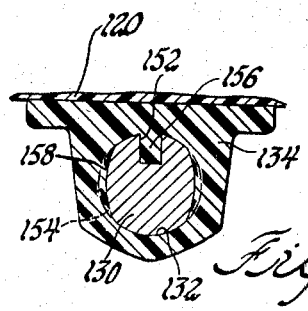
FIGURE 6 is an enlarged sectional view taken generally on the plane indicated by line 6—6 of FIGURE 4.
Figure 5:
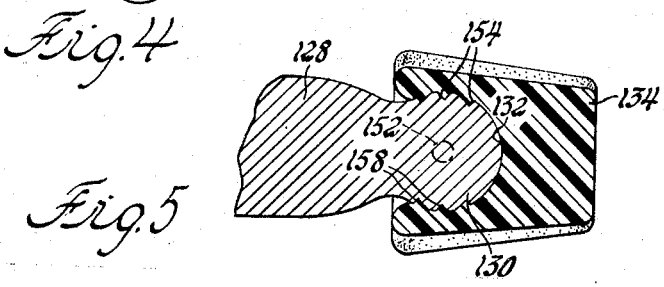
FIGURE 5 is an enlarged sectional view taken generally on the plane indicated by line 5—5 of FIGURE 4.

Another embodiment is shown in FIGURES 4 through 6, in which elements identical to those in the previous embodiment are denoted by adding 100 to their identifying numerals. As shown in FIGURE 4, a support member or arm 128 terminates in a ball portion 130 which is received within a socket portion 132 of a mounting member or bracket 134. As best seen in FIGURES 5 and 6, the ball portion includes a cylindrical opening or bore 152 and a plurality of meridian grooves 154 which extend approximately one-fourth the circumference of the ball portion and radiate about the axis of the pin.

A cylindrical projection or pin 156 extends from the surface of the socket portion and is received within bore 152. The projection and bore prevent movement of arm 128 relative to bracket 134 in directions transversely of pin 156. Rotational movement of arm 128 about pin 156 is prevented by a plurality of socket ribs 158 which are complementary to grooves 154 and are received therein. Thus ball portion 130 is normally held against movement within socket portion 132 by the frangible interlock means 152, 154, 156, 158.

However, application of a predetermined force transversely of pin 156 will shear the pin from the socket portion and deform the ribs as the ball portion rotates within the socket portion to permit arm 128 to swing to the broken line position shown in FIGURE 4. Here again the tight universal ball and socket connection prevents separation of the arm 128 from the bracket 134 during swinging movement.

While only two embodiments of this invention have been shown and described, further modifications will become readily apparent to those skilled in the art without departing from the scope of this invention.

I claim:

1. In combination with a vehicle body, a rear view mirror assembly comprising, a mirror support member, a mounting member mounted on the body, connecting means universally interconnecting the members, and interlock means normally preventing relative movement between the members, the interlock means being frangible upon application of a predetermined force to the support member to permit universal movement of the support member relative to the mounting member.

2. The combination according to claim 1, wherein the connecting means includes a ball portion formed on one of the members and a socket portion formed in the other member, and the interlock means include an opening formed in one of the portions and a projection formed on the other portion and received therein, the projection normally preventing movement of the ball portion within the socket portion in a direction transversely of the projection, the projection being frangible upon application of the predetermined force to the support member to enable movement of the ball portion within the socket portion to permit relative movement between the members.

3. The combination according to claim 2, wherein the mounting member is made of plastic material molded about the ball portion to form the socket portion, the projection and the ribs, the socket portion and the ball portion providing a universal connection between the support and mounting members upon fracture of the projection and deformation of the ribs to prevent separation of the support member from the mounting member.

4. The combination according to claim 2, wherein the interlock means include rib means formed on one of the portions and groove means formed in the other portion and received therein, the rib and groove means normally preventing movement of the ball portion within the socket portion relative to the projection, the rib means being deformable upon fracture of the projection by the application of the predetermined force to the support member to permit universal movement of the ball portion within the socket portion.

5. The combination according to claim 4, wherein the opening is an open slot extending partially through the ball portion and the projection is a flat key projecting from the surface of the socket portion and received within the slot to lock the ball portion against movement in a direction transversely of the key, the key being shearable from the socket portion by the ball portion upon application of the predetermined force to the support member in a direction transversely of the key.

6. The combination according to claim 4, wherein the opening is a cylindrical hole formed in the ball portion and the projection is a cylindrical pin projecting from the surface of the socket portion and received within the hole to lock the ball portion against movement in a direction transversely of the pin, the pin being shearable from the socket portion by the ball portion upon application of the predetermined force to the support member in a direction transversely of the pin.

7. In combination with a vehicle body, a rear view mirror assembly comprising, a mirror support member including a ball portion, a depression formed in the ball portion, a plurality of meridian grooves formed in the ball portion, a mounting member mounted on the body, a socket portion formed in the mounting member and receiving the ball portion to interconnect the support member and the mounting member, a projection formed on the socket portion and received within the depression to lock the support member to the mounting member, and a plurality of ribs formed on the socket portion and received within the grooves to prevent movement of the ball portion within the socket portion in a direction transversely of the projection, the projection being frangible and the ribs being deformable upon application of a predetermined force to the support member in a direction transversely of the projection to enable movement of the projection within the socket portion to permit movement of the support member relative to the mounting member.

References Cited

UNITED STATES PATENTS 2,989,897   6/1961   Bertell et al. _____ 248—484
3,212,740   10/1965   Greenberg _____ 287—87 X ROY D. FRAZIER, Primary Examiner.

FRANK DOMOTOR, Assistant Examiner.

U.S. Cl. X.R.
287—12, 21, 87